United States Patent [19]

Graber

[11] Patent Number: 4,721,894

[45] Date of Patent: Jan. 26, 1988

[54] TEMPERATURE MONITOR SYSTEM FOR AN INTERMITTENT DUTY WOUND FIELD MOTOR

[75] Inventor: David W. Graber, Millington, Mich.

[73] Assignee: General Motors Corporation, Detroit, Mich.

[21] Appl. No.: 56,437

[22] Filed: Jun. 1, 1987

[51] Int. Cl.[4] ............................................. G05D 23/24
[52] U.S. Cl. ..................................... 318/473; 318/471; 361/27
[58] Field of Search ............ 318/334, 345 C, 345 CB, 318/345 D, 345 E, 345 G, 345 H, 471, 473, 599, 634, 783, 811; 361/23, 25, 27

[56] References Cited

U.S. PATENT DOCUMENTS

| | | | |
|---|---|---|---|
| 3,590,365 | 6/1971 | Nelson | 318/471 X |
| 3,646,396 | 2/1972 | Fischer | 318/473 X |
| 3,868,554 | 2/1975 | Konrad | 318/434 |
| 4,102,198 | 7/1978 | Hammarlund | 340/595 X |
| 4,301,396 | 11/1981 | Bourke | 318/490 |
| 4,319,298 | 3/1982 | Davis et al. | 361/24 |
| 4,413,325 | 11/1983 | Elfner et al. | 364/557 |

*Primary Examiner*—Bentsu Ro
*Attorney, Agent, or Firm*—Mark A. Navarre

[57] ABSTRACT

A thermistor circuit for sensing the temperature of an intermittent duty wound field motor is connected between the field and armature windings of the motor. When the field and armature winding currents are substantially zero (off duty), the resistance of the thermistor circuit is sampled by the motor controller, using the armature and field winding conductors.

10 Claims, 3 Drawing Figures

TEMPERATURE MONITOR SYSTEM FOR AN INTERMITTENT DUTY WOUND FIELD MOTOR

This invention relates to an apparatus for measuring the temperature of a wound field motor, and more particularly to such an apparatus which does not require additional conductors between the motor and the motor controller.

BACKGROUND OF THE INVENTION

In motor control applications, knowledge of the motor temperature is often desired for current scheduling and/or overload protection. Generally, there are two methods of obtaining a temperature indication: actual measurement, and estimation.

The first method, actual measurement, is carried out with a temperature responsive device such as a thermistor. The device is typically mounted inside the housing of the motor and thereby provides a reliable and relatively accurate indication of the temperature. However, this approach significantly increases the cost of the installation since an additional dedicated conductor pair is required to connect the sensing device to the motor controller. The use of an additional dedicated conductor pair also requires an additional motor controller port and larger connectors.

The second method, estimation, is based on a theoretical or empirically derived model of the motor, and typically requires knowledge of the motor current, the ambient temperature and heat dissipation capacity of the motor. The approach does not significantly affect the cost of the installation, but the resulting temperature indication is only as reliable and accurate as the model.

SUMMARY OF THE PRESENT INVENTION

The present invention is directed to an improved apparatus for monitoring the temperature of an intermittent duty wound field DC motor. The apparatus according to this invention provides a temperature indication having substantially all of the reliability and accuracy of actual temperature measurement, but without the additional cost associated with the provision of a separate dedicated conductor pair.

This invention is carried forward in connection with a motor controller adapted to separately energize the armature and field windings of the motor via an armature conductor pair and a field conductor pair. A two terminal temperature responsive device such as a thermistor is connected between one conductor of the armature conductor pair and one conductor of the field conductor pair. The device is mounted on the motor in relation to a motor element it is desired to monitor the temperature of. As an example, the armature temperature may be sensed by mounting the device on a stationary but thermally related element, such as a brush holder.

The motor controller includes a monitoring mechanism, such as a voltage divider, for measuring the voltage potential between the conductors connected to the sensing device. Whenever the current in both the field and armature windings is substantially zero, such voltage potential is sampled as an indication of the motor element temperature. Depending on how often a zero current (off duty) condition occurs, the sampled temperature indication may be used by itself, or as in the illustrated embodiment, in connection with a temperature estimation routine. In the illustrated approach, the sampled temperature is used to update the estimated temperature value. With either approach, however, an additional dedicated conductor pair and the associated additional controller port and connector are not required.

DETAILED DESCRIPTION OF THE DRAWINGS

Figure 1:
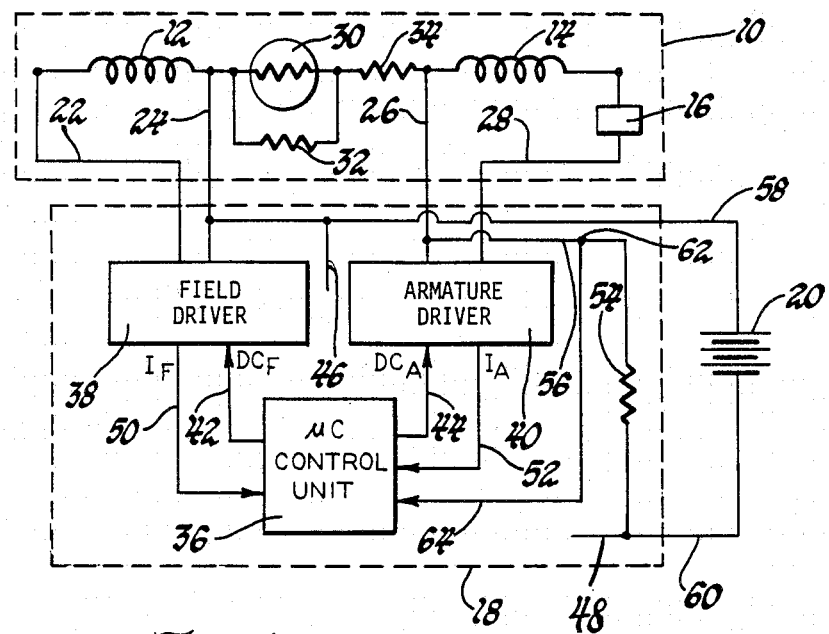
FIG. 1 is a schematic diagram of a motor control installation according to this invention, including a computer-based control unit for performing motor control and temperature monitoring.

Referring first to FIG. 1, the area designated by the reference numeral 10 schematically represents a wound field DC motor comprising a field winding 12, an armature winding 14 and a brush assembly 16 through which current is supplied to armature winding 14. A motor controller, shown schematically in the area designated by the reference numeral 18, is adapted to energize the armature and field windings 12 and 14 with current from a suitable source, such as the DC storage battery 20. Field winding 12 is energized via a field winding conductor pair comprising the conductors 22 and 24, and armature winding 14 is energized via an armature winding conductor pair comprising the conductors 26 and 28.

A thermistor 30, together with the resistors 32 and 34, form a thermistor circuit for sensing a temperature in the motor 10. The resistance of thermistor 30 varies in relation to its temperature, and the parallel resistor 32 serves to scale the resistance variation. The series resistor 34 minimizes self-heating of the thermistor 30 by limiting the current therethrough during normal operation of the motor.

One terminal of the thermistor circuit is connected to the conductor 24 of the field winding conductor pair, and the other terminal of the thermistor circuit is connected to the conductor 26 of the armature winding conductor pair.

The thermistor 30 is mounted on the motor 10 in relation to a motor element it is desired to monitor the temperature of. In the preferred embodiment, it is desired to monitor the temperature of the armature and the thermistor 30 is mounted on a stationary element of the brush assembly 16 which is thermally related to the armature.

In the illustrated embodiment, the motor controller 18 is built around a microcomputer-based control unit 36 and includes field and armature drivers 38 and 40 for interfacing the control unit 36 with the field and armature windings 12 and 14, respectively. Obviously, an analog control unit could be used in place of the microcomputer based control unit 36.

The control unit 36 schedules the energization duty cycles $DC_F$ and $DC_A$ for the field and armature windings 12 and 14 in relation to a number of inputs which may be demand related. The armature winding duty cycle $DC_A$ is also scheduled in relation to an armature temperature indication, as indicated below. Electrical representations of the field and armature winding duty cycles $DC_F$ and $DC_A$ are supplied to the field and armature drivers 38 and 40 via lines 42 and 44, respectively. The field and armature drivers 38 and 40, in turn, energize the field and armature windings 12 and 14 with current from battery 20 at the scheduled duty cycles. To this end, battery 20 is connected to various elements of the motor controller as schematically indicated by the broken lines 46 and 48. The field and armature drivers also include current measuring means, such as a resistive shunt (not shown), and provide electrical representations $I_F$ and $I_A$ of the field and armature currents to control unit 36 via input lines 50 and 52.

The thermistor circuit comprising the thermistor 30 and the resistors 32–34 is connected in series with the resistor 54 and the battery 20 via lines 56–60 to form a voltage divider. The junction 62 between the thermistor circuit and the resistor 54 is connected as an input to the control unit 36 via line 64. Due to the voltage divider operation, the voltage on line 64 varies in inverse relation to the resistance variations of the thermistor circuit and thus provides a motor temperature indication to the control unit 36 in the absence of armature and field winding energization.

Figure 2:
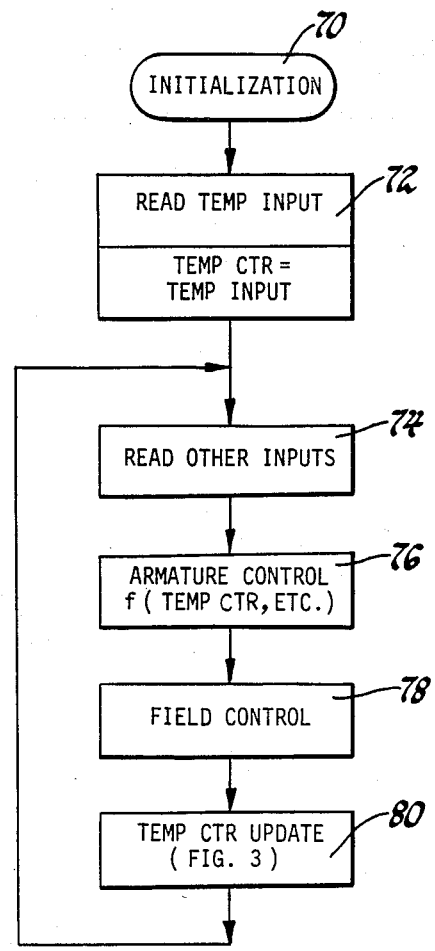
FIGS. 2 and 3 are flow diagrams representative of computer program instructions executed by the computer-based control unit of FIG. 1 in carrying out motor control functions and the temperature monitoring functions of this invention.
Figure 3:
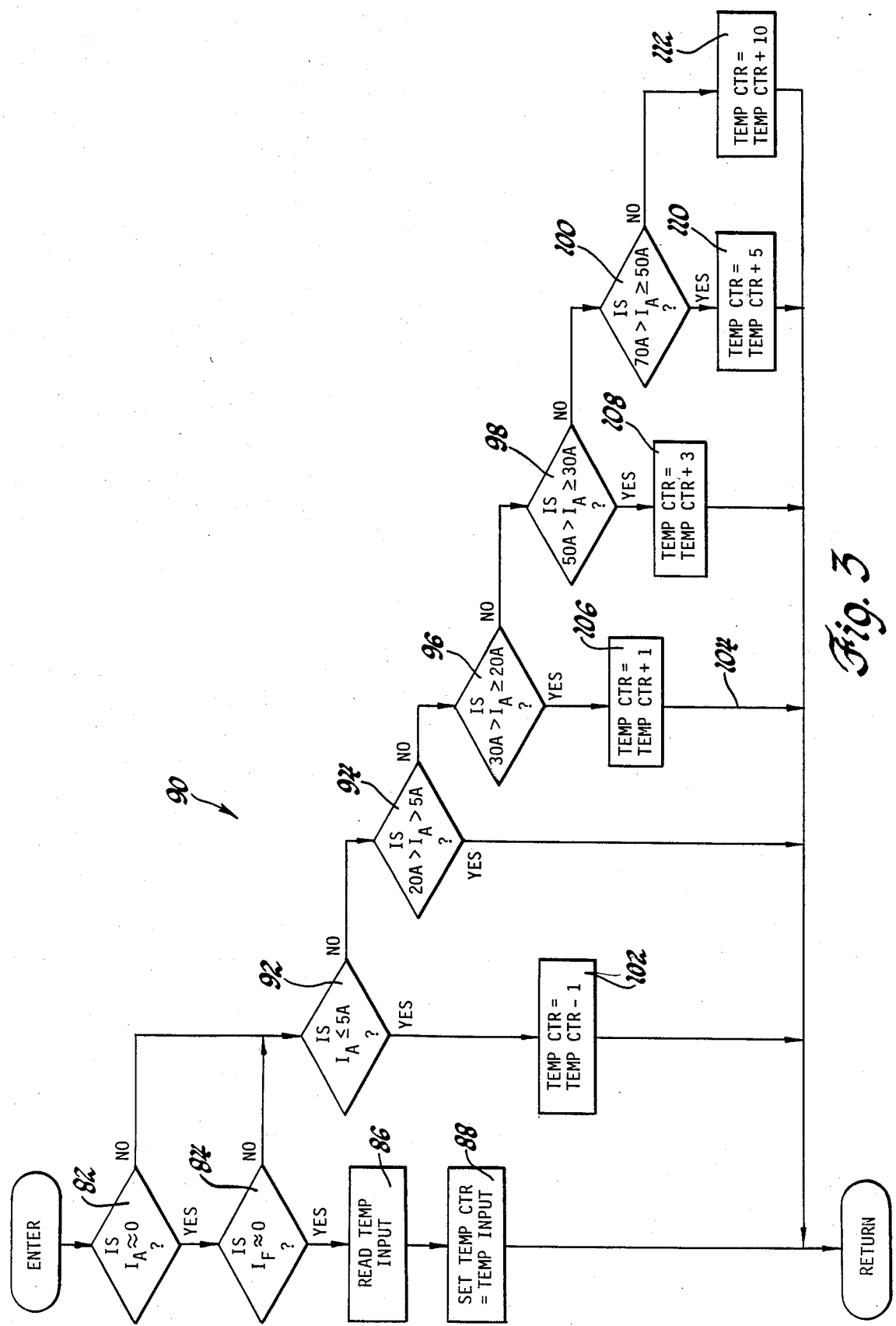

FIGS. 2 and 3 depict flow diagrams representative of computer program instructions executed by the control unit 36 in carrying out the motor control functions and the temperature monitoring functions of this invention. The flow diagram of FIG. 2 is a main loop program and the flow diagram of FIG. 3 is a subroutine for updating a temperature estimation routine.

Referring now to the main loop flow diagram of FIG. 2, the blocks 70 and 72 designate a series of instructions executed at the onset of each period of motor operation for initializing the various terms and registers of control unit 36. In particular, the block 72 serves to sample the voltage on line 64 as an indication of the initial motor temperature and to store such indication (TEMP INPUT) in a temperature counter TEMP CTR. Thereafter, the instruction blocks 74–80 are sequentially and repeatedly executed as indicated by the flow diagram lines to carry out the motor control and temperature monitoring functions.

The instruction blocks 74–78 pertain to the control of motor 10. Instruction block 74 serves to read the various inputs other than the temperature indication on line 64. As indicated above, these include the field and armature current signals $I_F$ and $I_A$ on lines 50 and 52, as well as other demand related signals. On the basis of the various inputs, the instruction blocks 76 and 78 are then executed to schedule the field and armature duty cycles $DC_F$ and $DC_A$ and to output electrical representations thereof to the field and armature drivers 38 and 40 via lines 42 and 44. As indicated at instruction block 76, the armature winding duty cycle $DC_A$ is scheduled as a partial function of the temperature indication stored in TEMP CTR.

The instruction block 80 signals the execution of the TEMP CTR update subroutine depicted by the flow diagram of FIG. 3. As indicated therein, the decision blocks 82–84 are first executed to determine if the armature and field currents $I_A$ and $I_F$ are both substantially zero. If so, the instruction blocks 86 and 88 are executed to read the temperature indication TEMP INPUT and to store such indication in TEMP CTR, as above, completing the routine.

If either of the decision blocks 82 and 84 are answered in the negative, the voltage on line 64 is not necessarily indicative of the motor temperature due to the influence of the field and armature winding voltages and the flow diagram portion, designated generally by the reference numeral 90, is executed to update the temperature indication stored in TEMP CTR based on the armature current $I_A$. This is appropriate in the illustrated embodiment because the motor element being monitored is the armature.

Referring to the flow diagram portion 90, one or more of the decision blocks 92–100 are executed to determine the magnitude of the armature current $I_A$ relative to six predefined current ranges. The current ranges relate the armature current to the consequent changes in the armature temperature, and are empirically determined for a given installation.

If the armature current $I_A$ is less than or equal to 5 amperes, the indication stored in TEMP CTR is decremented by one count, as indicated at the instruction block 102. If the armature current $I_A$ is greater than 5 amperes, but less than 20 amperes, the indication stored in TEMP CTR is not changed as indicated by the flow diagram line 104. If the armature current $I_A$ is at least 20 amperes, but less than 30 amperes, the indication stored in TEMP CTR is incremented by one count, as indicated at the instruction block 106. If the armature current $I_A$ is at least 30 amperes, but less than 50 amperes, the indication stored in TEMP CTR is incremented by three counts, as indicated at the instruction block 108. If the armature current $I_A$ is at least least 50 amperes, but less than 70 amperes, the indication stored in TEMP CTR is incremented by five counts, as indicated at the instruction block 110. If the armature current $I_A$ is greater than or equal to 70 amperes, the indication stored in TEMP CTR is incremented by ten counts, as indicated at the instruction block 112.

The accuracy of the temperature indication stored in TEMP CTR depends, to a significant extent, on how often the field and armature currents $I_F$ and $I_A$ fall to zero. Of course, the more often, the better. In a mechanization of this invention, substantially as illustrated herein, wherein the motor 18 was used to provide power assist for an automotive steering system, the temperature indication stored in TEMP CTR was found to reliably and accurately represent the motor armature temperature.

While this invention has been described in reference to the illustrated embodiment, various modifications thereto will occur to those skilled in the art, and it will be understood that systems incorporating such modifications may fall within the scope of this invention, which is defined by the appended claims.

The embodiments of the invention in which an exclusive property or privilege is claimed are defined as follows:

1. In a system including an intermittent duty motor having armature and field windings, and a motor controller adapted to separately supply current to the armature and field windings via an armature conductor pair and a field conductor pair, apparatus for obtaining a motor temperature indication without the use of an additional conductor connected between the motor and the motor controller, comprising:

temperature responsive means located at the motor and connected between one conductor of said armature conductor pair and one conductor of said field conductor pair, the temperature responsive means having a measurable parameter that varies with the temperature of a temperature responsive device thereof, such temperature responsive device being mounted in relation to a motor element it is desired to monitor the temperature of so that said measurable parameter varies in relation to the temperature of said motor element; and monitoring means located at the motor controller and connected to said temperature responsive means through said one conductor of the armature conductor pair and said one conductor of the field conductor pair, said monitoring means being effective whenever the armature winding current and the field winding current are substantially zero for obtaining a sample of the measurable parameter of said temperature responsive means as an indication of the motor element temperature.

2. Apparatus as set forth in claim 1, wherein the temperature responsive device is a thermistor and the measurable parameter is the resistance of the temperature responsive means.

3. Apparatus as set forth in claim 1, wherein the motor includes a brush assembly for directing the armature current to the armature winding, such brush assembly being thermally related to the motor armature, and wherein the temperature responsive device is mounted on the brush assembly, whereby the sample of the measurable parameter is indicative of the armature temperature.

4. Apparatus as set forth in claim 1, further including:

temperature estimation means located at the motor controller having means for storing a motor temperature indication, means for adjusting the value of said stored motor temperature indication in accordance with a motor operating parameter related to the temperature of said motor element, and means for replacing the stored motor temperature indication with the sample of said measurable parameter obtained by said monitoring means whenever the armature winding current and the field winding current are substantially zero.

5. Apparatus for monitoring the temperature of an intermittent duty motor having separate armature and field windings, comprising in combination:

the control means adapted to separately supply current to the armature and field windings of the motor, an armature conductor pair connected between the control means and the armature winding for conducting the armature winding current, and a field conductor pair connected between the control means to the field winding for conducting the field winding current;

temperature responsive means having a measurable parameter that varies with the temperature of a temperature responsive device thereof, the temperature responsive means being connected between one conductor of the armature conductor pair and one conductor of the field conductor pair, and the temperature responsive device being mounted on the motor in relation to a motor element it is desired to monitor the temperature of;

monitoring means connected to the temperature responsive means via said one conductor of the armature conductor pair and said one conductor of the field conductor pair, and effective whenever the armature winding current and the field winding current are substantially zero for obtaining a measure of the measurable parameter of said temperature responsive means as an indication of the motor element temperature, whereby the temperature of the motor element is obtained without requiring additional dedicated conductor means connected between the temperature responsive means and the control means or the monitoring means.

6. The apparatus set forth in claim 5, wherein the temperature responsive device is a thermistor, and the measured parameter is the resistance of the temperature responsive means.

7. The apparatus set forth in claim 5, wherein the motor includes a brush assembly for directing the armature current to the armature winding, such brush assembly being thermally related to the motor armature, and wherein the temperature responsive device is mounted on the brush assembly, whereby the measured parameter is indicative of the armature temperature.

8. Apparatus as set forth in claim 5, further including:

temperature estimation means located at the motor controller having means for storing a motor temperature indication, means for adjusting the value of said stored motor temperature indication in accordance with a motor operating parameter related to the temperature of said motor element, and means for replacing the stored motor temperature indication with the sample of said measurable parameter obtained by said monitoring means whenever the armature winding current and the field winding current are substantially zero.

9. A system including an intermittent duty motor having armature and field windings, and a motor controller adapted to separately supply current to the armature and field windings via an armature conductor pair and a field conductor pair, the improvement wherein:

the motor includes temperature responsive means connected between one conductor of said armature conductor pair and one conductor of said field conductor pair, the temperature responsive means having a measurable parameter that varies with the temperature of a temperature responsive device thereof, such temperature responsive device being mounted in relation to a motor element it is desired to monitor the temperature of so that said measurable parameter varies in relation to the temperature of said motor element; and the motor controller includes monitoring means connected to said temperature responsive means through said one conductor of the armature conductor pair and said one conductor of the field conductor pair, said monitoring means being effective whenever the armature winding current and the field winding current are substantially zero for obtaining a sample of the measurable parameter of said temperature responsive means as an indication of the motor element temperature, whereby the temperature indication is obtained without the use of an additional conductor connected between the motor and the motor controller.

10. The improvement set forth in claim 9, wherein:

the controller includes temperature estimation means having means for storing a motor temperature indication, means for adjusting the value of said stored motor temperature indication in accordance with a motor operating parameter related to the temperature of said motor element, and means for replacing the stored motor temperature indication with the sample of said measurable parameter obtained by said monitoring means whenever the armature winding current and the field winding current are substantially zero.

* * * * *